United States Patent
Nakada et al.

(10) Patent No.: US 10,275,643 B2
(45) Date of Patent: Apr. 30, 2019

(54) ELECTRONIC DEVICE, ELECTRONIC DEVICE CONTROL METHOD, AND COMPUTER-READABLE RECORDING MEDIUM HAVING STORED THEREON ELECTRONIC DEVICE CONTROL PROGRAM

(71) Applicant: NIKON CORPORATION, Tokyo (JP)

(72) Inventors: Yuko Nakada, Yokohama (JP); Toshinori Take, Yokohama (JP); Hiroki Uwai, Yokohama (JP); Maki Suzuki, Tokyo (JP); Kazuma Hosoi, Kawasaki (JP); Masakazu Sekiguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/818,083

(22) Filed: Aug. 4, 2015

(65) Prior Publication Data
US 2015/0339518 A1   Nov. 26, 2015

Related U.S. Application Data

(63) Continuation of application No. 13/971,704, filed on Aug. 20, 2013, now abandoned, which is a (Continued)

(30) Foreign Application Priority Data

Mar. 14, 2011   (JP) ................................ 2011-055786

(51) Int. Cl.
*G06K 9/00* (2006.01)
*G06K 9/18* (2006.01)
(Continued)

(52) U.S. Cl.
CPC ..... *G06K 9/00288* (2013.01); *G06F 16/5866* (2019.01); *G06K 9/18* (2013.01);
(Continued)

(58) Field of Classification Search
USPC ......... 382/103, 115–118, 181–231, 305, 306
See application file for complete search history.

(56) References Cited

U.S. PATENT DOCUMENTS

| | | |
|---|---|---|
| 6,628,808 B1 | 9/2003 | Bach et al. |
| 6,922,489 B2 | 7/2005 | Lennon |

(Continued)

FOREIGN PATENT DOCUMENTS

| | | |
|---|---|---|
| JP | 2002-189757 | 7/2002 |
| JP | 2002-324237 A | 11/2002 |

(Continued)

OTHER PUBLICATIONS

Japanese Office Action dated Jul. 14, 2015 in Japanese Patent Application 2013-504531.

(Continued)

*Primary Examiner* — Alex Kok S Liew
(74) *Attorney, Agent, or Firm* — Venable LLP; Henry J. Daley

(57) ABSTRACT

An electronic device includes: a storage unit that stores therein a plurality of images in which a first subject is imaged, and a plurality of images in which a second subject which is different from the first subject is imaged, and stores therein supplementary information about the first subject and the second subject including information about dates and times of imaging, and sites of imaging; and an extracting unit that extracts images whose dates and times of imaging are different from each other, and images imaged at a common site of imaging based on the supplementary information when extracting an image in which the first subject (Continued)

is imaged and an image in which the second subject is imaged. In the electronic device, when the first subject and the second subject are humans, the storage unit stores therein, as the supplementary information, birth dates of the first and second people.

13 Claims, 10 Drawing Sheets

Related U.S. Application Data continuation of application No. PCT/JP2012/000939, filed on Feb. 13, 2012.

(51) Int. Cl.
| | | |
|---|---|---|
| *G06F 16/58* | (2019.01) | |
| *H04N 1/21* | (2006.01) | |
| *H04N 9/82* | (2006.01) | |
| *G06K 9/62* | (2006.01) | |
| *H04N 1/00* | (2006.01) | |
| *G06Q 50/00* | (2012.01) | |
| *H04N 5/232* | (2006.01) | |

(52) U.S. Cl.
CPC ........... *G06K 9/6267* (2013.01); *G06Q 50/01* (2013.01); *H04N 1/00336* (2013.01); *H04N 1/21* (2013.01); *H04N 5/232* (2013.01); *H04N 9/8233* (2013.01); *G06K 2009/00328* (2013.01); *H04N 2201/3214* (2013.01); *H04N 2201/3215* (2013.01); *H04N 2201/3274* (2013.01)

(56) References Cited

U.S. PATENT DOCUMENTS

| | | | |
|---|---|---|---|
| 7,440,595 B2 | 10/2008 | Kohno | |
| 7,586,524 B2* | 9/2009 | Tsue | G11B 27/034 |
| | | | 348/231.2 |
| 10,068,158 B2 | 9/2018 | Kashiwa et al. | |
| 2002/0057849 A1* | 5/2002 | Senda | G06T 5/50 |
| | | | 382/284 |
| 2002/0078038 A1 | 6/2002 | Kotani | |
| 2002/0131641 A1 | 9/2002 | Luo et al. | |
| 2003/0072486 A1* | 4/2003 | Loui | G06T 11/60 |
| | | | 382/175 |
| 2002/0133159 A1 | 7/2003 | Grosso et al. | |
| 2005/0105806 A1 | 5/2005 | Nagaoka et al. | |
| 2005/0196021 A1 | 9/2005 | Seto et al. | |
| 2006/0182436 A1 | 8/2006 | Yoda et al. | |
| 2007/0165968 A1 | 7/2007 | Terayoko | |
| 2007/0228159 A1 | 10/2007 | Kashiwa et al. | |
| 2008/0095470 A1* | 4/2008 | Chao | G06K 9/38 |
| | | | 382/298 |
| 2009/0116752 A1 | 5/2009 | Isomura et al. | |
| 2009/0273667 A1 | 11/2009 | Nozaki et al. | |
| 2009/0303329 A1 | 12/2009 | Morisaki | |
| 2010/0026822 A1* | 2/2010 | Hahm | H04N 7/181 |
| | | | 348/218.1 |
| 2010/0142833 A1 | 6/2010 | Ishizawa | |
| 2010/0156834 A1* | 6/2010 | Sangster | G06K 9/00295 |
| | | | 345/173 |
| 2011/0150302 A1 | 6/2011 | Moriyama et al. | |
| 2012/0158700 A1 | 6/2012 | Dodson et al. | |

FOREIGN PATENT DOCUMENTS

| | | |
|---|---|---|
| JP | 2002-342743 A | 11/2002 |
| JP | 2003-281163 A | 10/2003 |
| JP | 2004-048648 A | 2/2004 |
| JP | 2005-515720 A | 5/2005 |
| JP | 2006-180074 A | 7/2006 |
| JP | 2007-060562 A | 3/2007 |
| JP | 2007-122431 | 5/2007 |
| JP | 2007-133838 A | 5/2007 |
| JP | 2007-143093 A | 6/2007 |
| JP | 2007-243485 A | 9/2007 |
| JP | 2007-257312 A | 10/2007 |
| JP | 2007-280291 A | 10/2007 |
| JP | 2007-312058 A | 11/2007 |
| JP | 4208113 | 10/2008 |
| JP | 2008-276668 A | 11/2008 |
| JP | 2009-294902 A | 12/2009 |
| JP | 2010-141412 A | 6/2010 |
| JP | 2010-251841 A | 11/2010 |
| JP | 2011-19013 | 1/2011 |
| WO | WO-2006/064696 A1 | 6/2006 |

OTHER PUBLICATIONS

International Search Report of PCT/JP/2012/000939 dated Mar. 6, 2012.
Office Action issued in Japanese Patent Application No. 2013-504531 dated Jan. 5, 2016.
Office Action in Japanese Patent Application No. 2016-076208, dated Jun. 27, 2017.
Office Action issued in Japanese Patent Application No. 2016-076208, dated Mar. 14, 2017.
Office Action issued in Japanese Application No. 2017-186973, dated Dec. 11, 2018.

* cited by examiner

USER SUPPLEMENTARY INFORMATION

| USER ID | DATE OF BIRTH | ADDRESS |
|---|---|---|
| 12356-FAM-1 | JULY 7, 1997 | XX-X YURAKUCHO 1-CHOME, CHIYODA-KU, TOKYO |

| GROUP INFORMATION | | | | | |
|---|---|---|---|---|---|
| FAMILY1 | | FAMILY2 | | FAMILY3 | |
| RELATION-SHIP | DATE OF BIRTH | RELATION-SHIP | DATE OF BIRTH | RELATION-SHIP | DATE OF BIRTH |
| FATHER | NOVEMBER 1, 1967 | MOTHER | OCTOBER 12, 1968 | ELDER SISTER | AUGUST 13, 1995 |

| USER ID | |
|---|---|
| 12356-FRI-1 | |

| GROUP INFORMATION | | |
|---|---|---|
| FRIEND 1 | FRIEND 2 | FRIEND 3 |
| NAME | NAME | NAME |
| TARO XX | HANAKO YY | JIRO ZZ |

FIG. 3

IMAGE SUPPLEMENTARY INFORMATION

| FILE NAME | FOCUS INFORMATION | SUBJECT-RELATED INFORMATION |
|---|---|---|
| PIK012.JPG | CENTER | HIM/HERSELF (FRONT), MOTHER (RIGHT) |

| DATE AND TIME OF IMAGING | | SITE OF IMAGING | |
|---|---|---|---|
| DATE OF BIRTH | EVENT NAME | LATITUDE/LONGITUDE | NAME OF SITE |
| MARCH 12, 2011 | GRADUATION CEREMONY | * | XY JUNIOR HIGH SCHOOL |

FIG. 4

THEME SETTING INFORMATION

| NAME OF THEME | KEYWORDS | | | TEMPLATE |
|---|---|---|---|---|
| ENROLLMENT CEREMONY OF JUNIOR HIGH SCHOOL | ENROLLMENT, ENROLLMENT CEREMONY, JUNIOR HIGH, JUNIOR HIGH SCHOOL, JUNIOR HIGH SCHOOL STUDENT, SCHOOL UNIFORM.... | | | T1 |
| DATE AND TIME OF IMAGING | | SITE OF IMAGING | | |
| TIMING | | LATITUDE/LONGTUDE | NUMBER OF SITE | |
| NUMBER OF YEARS | APRIL | * | JUNIOR HIGH SCHOOL | |
| YEAR OF BIRTH+12 | | | | |

FIG. 5

THEME SETTING INFORMATION

| NAME OF THEME | KEYWORDS | TEMPLATE |
|---|---|---|
| PREMIERE OF PIANO CONCERTS | PIANO, FIRST, FOR THE FIRST TIME, CONCERT, SHOW, RECITAL... | T 2 |

| DATE AND TIME OF IMAGING || SITE OF IMAGING ||
|---|---|---|---|
| TIME ORDER | TIMING | LATITUDE/LONGTUDE | NAME OF SITE |
| FIRST | * | * | HALL |

FIG. 9

ELECTRONIC DEVICE, ELECTRONIC DEVICE CONTROL METHOD, AND COMPUTER-READABLE RECORDING MEDIUM HAVING STORED THEREON ELECTRONIC DEVICE CONTROL PROGRAM

CROSS-REFERENCE OF RELATED APPLICATION

This application is a continuation of prior application Ser. No. 13/971,704, filed Aug. 20, 2013, which is a continuation of International Application No. PCT/JP2012/000939, filed Feb. 13, 2012, which claims priority to Japanese Application No. 2011- 055786, filed Mar. 14, 2011.

BACKGROUND

1. Technical Field

The present invention relates to an electronic device, an electronic device control method, and a computer-readable recording medium having stored thereon an electronic device control program.

2. Related Art

Conventionally, an album creating apparatus for creating an album has been proposed. Such an album creating apparatus uses supplementary information, such as dates and times of imaging and sites of imaging, that is added to images that have been imaged (for example, Patent Literature 1).

Patent Literature 1: Japanese Patent No. 4208113

As there is not a prior art literature that is currently recognized, description about prior art literatures is omitted.

SUMMARY

In conventional techniques, an album is created based on supplementary information about a single person, and use of the supplementary information is limited. Therefore, it is an object of an aspect of the innovations herein to provide an electronic device, an electronic device control method and a computer-readable recording medium having stored thereon an electronic device control program, which are capable of overcoming the above drawbacks accompanying the related art. The above and other objects can be achieved by combinations described in the independent claims. Also, the dependent claims define advantageous, specific examples of the present invention.

A first aspect of the present invention provides an electronic device including: a storage unit that stores therein a plurality of images in which a first subject is imaged, and a plurality of images in which a second subject who is different from the first subject is imaged, and stores therein supplementary information about the first subject and the second subject; and an extracting unit that extracts images whose dates and times of imaging are different from each other based on the supplementary information when extracting an image in which the first subject is imaged and an image in which the second subject is imaged.

A second aspect of the present invention provides an electronic device including: a storage unit that stores therein a plurality of images in which a first subject is imaged, and a plurality of images in which a second subject who is different from the first subject is imaged, and stores therein supplementary information about the first subject and the second subject; and an extracting unit that extracts images such that time axes of the first subject and the second subject relatively align with each other based on the supplementary information when extracting an image in which the first subject is imaged and an image in which the second subject is imaged.

A third aspect of the present invention provides a program that controls a computer to perform: a storage function of storing a plurality of images in which a first subject is imaged, and a plurality of images in which a second subject who is different from the first subject is imaged, and storing supplementary information about the first subject and the second subject; and an extraction function of extracting images such that time axes of the first subject and the second subject relatively align with each other based on the supplementary information when extracting an image in which the first subject is imaged and an image in which the second subject is imaged.

The summary clause does not necessarily describe all necessary features of the embodiments of the present invention. The present invention may also be a sub-combination of the features described above.

BRIEF DESCRIPTION OF THE DRAWINGS

FIG. 3 shows an example of user supplementary information.

FIG. 4 shows an example of image supplementary information.

FIG. 5 shows an example of theme setting information.

FIG. 9 shows another example of theme setting information.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
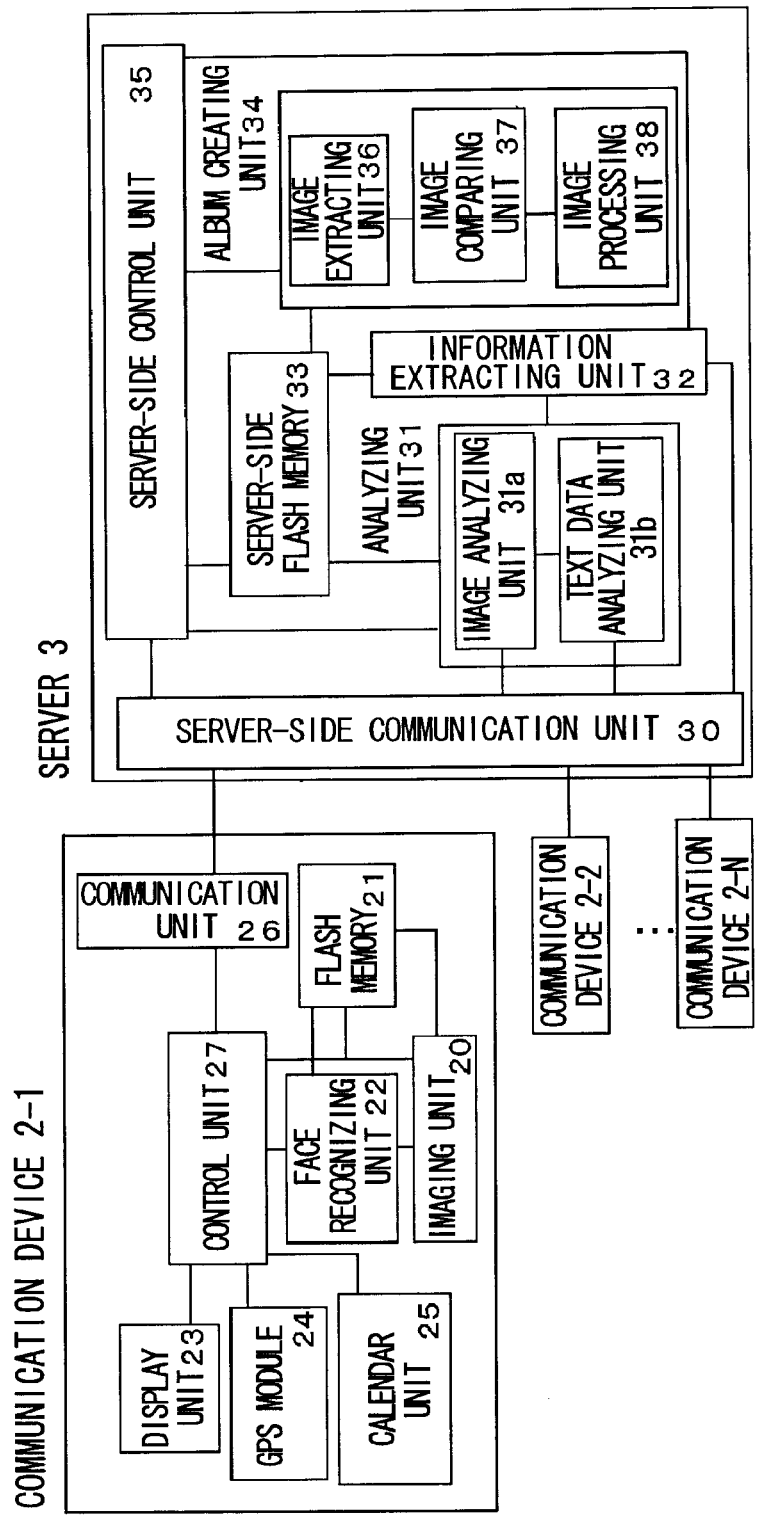
FIG. 1 is a diagram that shows an album creation system 1 according to an embodiment.

FIG. 1 is a diagram that shows an album creation system 1 according to an embodiment. The album creation system 1 has a plurality of communication devices 2-1, 2-2 ... 2-N that transfers images and make requests for album creation, and a server 3 that stores therein images from the plurality of communication devices 2 and creates an album.

The communication devices 2 may be devices such as a personal computer, a cellular phone, a digital camera, and a PDA. The explanation of the present embodiment takes a digital camera as an example.

The communication device 2 has: an imaging unit 20 that performs imaging; a nonvolatile flash memory 21 that stores therein images imaged by the imaging unit 20 and various types of data; a face recognizing unit 22; a display unit 23 that displays images imaged by the imaging unit 20; a GPS (global positioning system) module 24 that detects the position (absolute position) of the communication device 2; a calendar unit 25 that stores therein dates and times; a communication unit 26 that communicates with the server 3; and a control unit 27 that controls the communication device 2. An example of the display unit 23 is a liquid crystal display, and a touch panel for inputting various types of information may be provided to the display unit. Examples of the communication unit 26 include a wireless communication unit that accesses an electric communication line such as the Internet, and a Felica (registered trademark) chip.

The imaging unit 20 has: an imaging lens that includes a focus lens; a focus detection system that detects a focus position of the focus lens; an imaging device that images a light flux from the imaging lens; and a meta information creating unit that adds, to images, imaging-related information such as focus information detected by the focus detection system, dates and times of imaging acquired from the calendar unit 25, and sites of imaging acquired from the GPS module 24.

The flash memory 21 stores therein images imaged by the imaging unit 20 as described above. Furthermore, the flash memory 21 stores therein facial images and attribute information corresponding to the facial images that are used for facial recognition in images imaged by the imaging unit 20. The attribute information is input to the communication device 2 by a user using, for example, a touch panel provided to the display unit 23. The attribute information includes names, birth dates, addresses, and group information such as relationship with the user of the communication device 2 like family relationship. Note that even if any piece of the attribute information lacks on the side of the communication device 2, it does not affect imaging negatively.

The face recognizing unit 22 detects a face in an image imaged by the imaging unit 20, and recognizes whose face the face is based on facial images stored in the flash memory 21. Note that the face recognizing unit 22 may recognize, in addition to human faces, faces of pets such as dogs and cats. The recognition result of the face recognizing unit 22 is added, by the meta information creating unit, to the imaging-related information as subject-related information. Note that facial recognition of pets may be performed by the technique disclosed, for example, in Japanese Patent Application Publication No. 2011-19013.

The control unit 27 has a CPU, and transmits images to the server 3 via the communication unit 26. At this time, the control unit 27 may transmit imaging-related information created by the meta information creating unit of the imaging unit 20 in association with each image. Note that images transmitted to the server 3 by the communication device 2 may be either still images or motion images, and if the communication device 2 has a keyboard or a microphone, text data or audio data may be transmitted to the server 3. At this time, for example, images and audio data may be transmitted from a digital camera to the server 3, and text data may be transmitted from a personal computer to the server 3.

Also, the control unit 27 transmits, to the server 3, attribute information stored in the flash memory 21. At this time, the control unit 27 may transmit the attribute information in association with images, or may transmit the attribute information as separate information without associating it with images. Note that the control unit 27 transmits, to the server 3, attribute information of new members, and updated attribute information if there is any update.

The server 3 has a server-side communication unit 30, an analyzing unit 31, an information extracting unit 32, a server-side flash memory 33, an album creating unit 34 and a server-side control unit 35. The server 3 may be a personal computer used by the user of the communication device 2, or an information processing device that is managed by an administrator who is not the user.

The server-side communication unit 30 communicates with the communication unit 26 of the communication device 2. Although it is assumed in the present embodiment that communication is established via an electric communication line, wired communication or wireless communication may be employed.

The analyzing unit 31 analyzes data received by the server-side communication unit 30. The analyzing unit 31 is provided with an image analyzing unit 31a and a text data analyzing unit 31b. Note that an audio data analyzing unit may be additionally provided.

The image analyzing unit 31a has an OCR (optical character reader) unit, a metadata analyzing unit and a face recognizing unit.

The OCR unit reads out characters in an image. The OCR unit converts characters in an image, such as "XX Elementary School, Graduation Ceremony, 2009" and "YY Zoo", into text data.

The metadata analyzing unit analyzes a focus position, a subject-related information, a date and time of imaging, and a site of imaging that are included in imaging-related information associated with an image, and generates text data.

The face recognizing unit detects faces in a transmitted image when subject-related information is not included in imaging-related information associated with the image for reasons such as that the communication device 2 does not have a facial recognition function. The face recognizing unit further identifies a face detected based on a facial image stored in the server-side flash memory 33 described below.

The text data analyzing unit 31b compares text data input by the server-side communication unit 30 with text data created as a result of conversion by the OCR unit, and compares a date and time of imaging and a site of imaging included in imaging-related information with text data created as a result of conversion by the OCR unit. For example, the text data analyzing unit 31b performs comparison to know whether a site of imaging (latitude/longitude) detected by the GPS module 24 matches with text data created as a result of conversion by the OCR unit (whether there is inconsistency therebetween), or whether a date and time of imaging acquired from the calendar unit 25 matches with text data created as a result of conversion by the OCR unit (whether there is inconsistency therebetween).

The information extracting unit 32 extracts information acquired as a result of analysis by the analyzing unit 31, inquires of the communication device 2 via the server-side communication unit 30 when there is inconsistency or unclarity in the information acquired as a result of analysis by the analyzing unit 31, and extracts further information via the server-side communication unit 30. Examples of situations where the information extracting unit 32 extracts further information include events, such as festivals and fireworks shows, that are determined to be held at the site based on a site of imaging and a date and time of imaging.

The server-side flash memory 33 is a nonvolatile memory that stores therein images transmitted from the communication device 2 and image supplementary information in association with the images. The server-side flash memory 33 further stores therein user supplementary information about the user, theme setting information about themes for creating pair albums, and templates for arranging images based on the themes. The information is further described below.

In the present embodiment, the album creating unit 34 creates an album by associating a plurality of images whose dates and times of imaging are different. For example, when creation of an album for enrollment ceremonies of junior high schools for family members is requested, the album creating unit 34 creates an album based on images of the enrollment ceremony of a junior high school for each of the father, the mother, the eldest son, and the eldest daughter stored in the server-side flash memory 33.

Also, the album creating unit 34 may create an album based on images of or near a certain site that are imaged before a broom and a bride get to know each other.

The album creating unit 34 has an image extracting unit 36, an image comparing unit 37 and an image processing unit 38.

The image extracting unit 36 extracts images, from the server-side flash memory 33, according to a theme that is designated based on control of the server-side control unit 35.

The image comparing unit 37 compares a plurality of images with each other. For example, when the image comparing unit 37 extracts images for a certain theme and there is a plurality of pictures of the father that are suited for the theme, the image comparing unit 37 extracts pictures that are determined to be the best among them such as images that show smiles of the father based on smile detection. Furthermore, the image comparing unit 37 compares pictures extracted for each family member, and switches from one image to another. For example, if pictures of other family members than the father each show only one corresponding person, a picture that shows only the father is selected, and if, in several pictures, there is cherry blossom in the background, other pictures are switched to those with cherry blossom in the background. The overall balance is sought in this way. At this time, for example, a picture in which the mother and the eldest daughter face each other (the mother is positioned on the right, and the eldest daughter is positioned on the left) may be extracted.

The image processing unit 38 processes images extracted based on the result of comparison by the image comparing unit 37. At this time, the image processing unit 38 performs process of resizing, trimming, and sizing of images, and process for displaying, together with the images, titles and subtitles such as dates and times, and sites of imaging.

The server-side control unit 35 controls entire operation of the server 3, and in the present embodiment, performs control of album creation based on themes. Note that each of the functions of the server 3 may be implemented by a software program.

Operation of the album creation system 1 according to the present embodiment constituted in this way is explained hereinafter.

(Flowchart S10)

Figure 2:
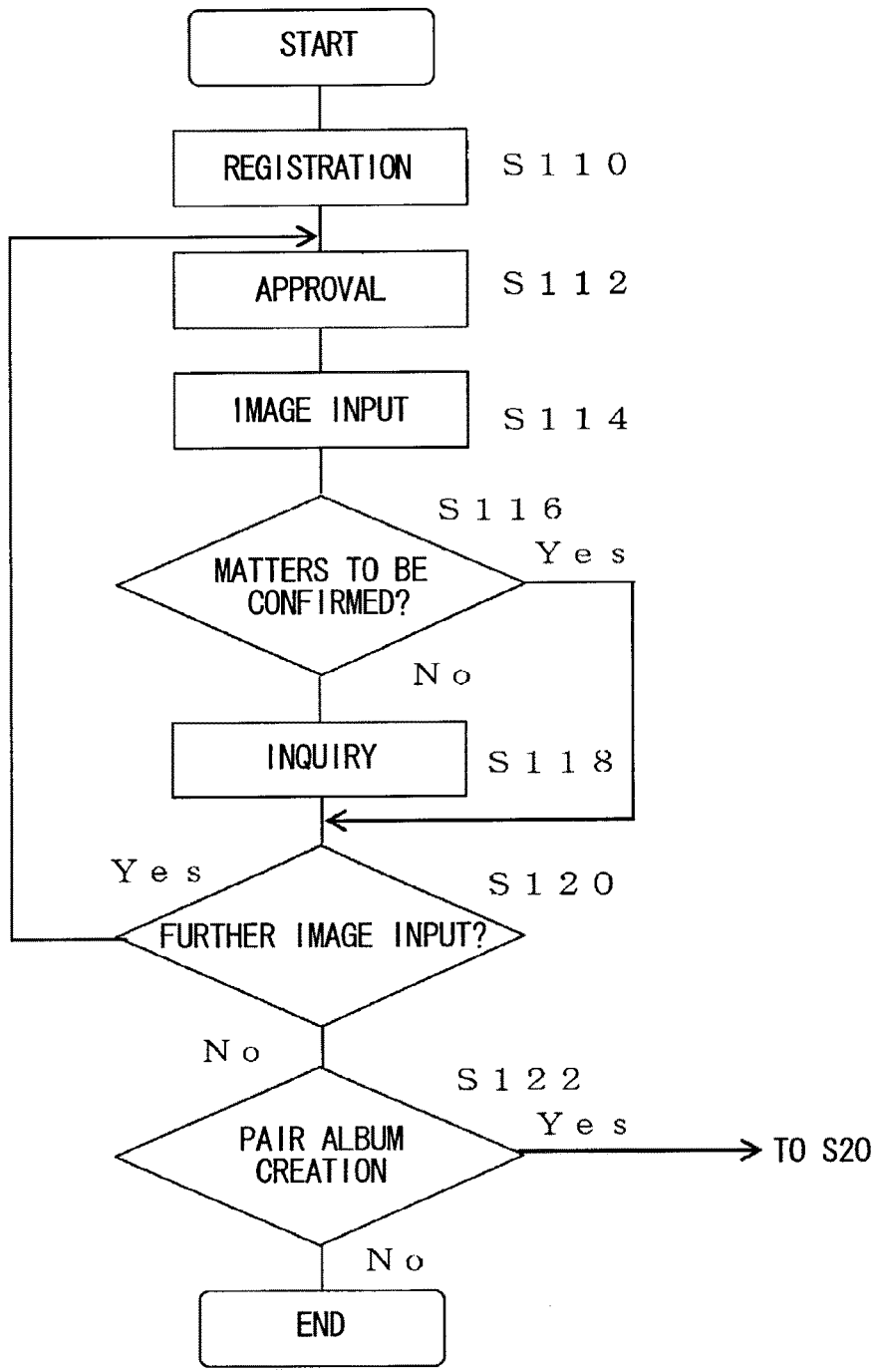
FIG. 2 is a flowchart about image input (S10) performed by a server-side control unit 35.

FIG. 2 is a flowchart about image input (S10) performed by the server-side control unit 35, and hereinafter, operation up to the image input is explained with reference to the flowchart. The operation of the step S10 starts when the communication device 2 makes a request, to the server 3, for input of an image.

The server-side control unit 35 performs user registration with the communication device 2 (S110). At this time, the server-side control unit 35 may acquire attribute information from the communication device 2 via the communication unit 26 and the server-side communication unit 30. Furthermore, the server-side control unit 35 assigns two user IDs, like the ones shown below, to the user.

No. 123456-FAM-1
No. 123456-FRI-1

Here, in the first user ID, "FAM" indicates FAMILY, and the server-side control unit 35 registers the family as group information. At this time, when a pair album of images of the family members is to be created, all images registered, in the server 3, with the ID No. 123456-FAM-1 may be allowed to be used. Note that "-1" at the end indicates the first generation of the family. For example, if the children are to go out on their own in the future, they may have an ID No. 123456-FAM-2, in addition to ID No. 123456-FAM-1.

In the second user ID, "FRI" indicates FRIEND, and the server-side control unit 35 registers a friend as group information. At this time, when a pair album of images of the friends is to be created, all images registered, in the server 3, with the ID No. 123456-FRI-1 may be allowed to be used, or alternatively approval may be required for using each of the images.

The server-side control unit 35 generates user supplementary information based on a user ID and attribute information, and stores the user supplementary information in the server-side flash memory 33.

FIG. 3 shows an example of user supplementary information. In the example shown in FIG. 3, the user supplementary information includes the birth date and the address of the user associated with the user ID, and group information of the family members. The group information of the family members includes relationship with the user for identifying a family member, and the birth dates of the family members.

The user supplementary information further includes group information of friends associated with the user ID. The group information of friends includes names of the friends. As in the case of the information of the family members, the birth dates of the friends may be added as the group information.

When there is user supplementary information not included in attribute information acquired from the communication device 2, the server-side control unit 35 displays, on the communication device 2, a screen for prompting the user to input the information and acquires the information.

Note that a purpose of registering birth dates of the user and his/her family members at the step S110 is for determining ages of the user and his/her family members at the time of imaging by comparing the birth dates with dates and times of imaging of input images. For example, when a pair album with a theme of images that are imaged when a family member is 10 years old is to be created, the server-side control unit 35 uses the image extracting unit 36 to extract images, from the server-side flash memory 33, that were imaged 10 years after the birth date. Similarly, when a pair album at the time of enrollment in an elementary school is to be created, the server-side control unit 35 extracts images, from the server-side flash memory 33, that were imaged in April and six years after the birth date.

The server-side control unit 35 confirms a user ID prior to input of images (step S112). Here, in the following explanation, it is assumed that authentication is performed with the ID No. 123456-FAM-1.

The server-side control unit 35 inputs, via the communication unit 26 and the server-side communication unit 30, images and imaging-related information created by the meta information creating unit of the imaging unit 20 (S114). At this time, the server-side control unit 35 may acquire, from the communication device 2, images one by one or multiple images collectively.

The server-side control unit 35 creates image supplementary information based on the images and the imaging-related information, and stores the image supplementary information in the server-side flash memory 33.

FIG. 4 shows an example of image supplementary information. In the example shown in FIG. 4, the image supplementary information includes focus information, subject-related information, a date and time of imaging, and a site of imaging associated with a file name of an image. The subject-related information includes information for identifying a subject, and information for identifying orientation of the subject. The date and time of imaging includes a date and year, and an event name of an event at which the image is imaged. Also, the site of imaging includes latitude/longitude, and a name of a site where the image is imaged. Note that "*" in the example shown in FIG. 4 indicates that applicable information is not available.

Also, in the step S114, the server-side control unit 35 analyzes an image input by using the analyzing unit 31, and extracts additional information of the image supplementary information by using the information extracting unit 32 to update the image supplementary information stored in the server-side flash memory 33. Here, facial recognition by the image analyzing unit 31*a* and collection of event information by the information extracting unit 32 are performed. Note that when each piece of the image supplementary information has already been input, analysis of the piece by the analyzing unit 31 may be omitted, or if inconsistency is found as a result of analysis of the piece by the analyzing unit 31, such inconsistency may be confirmed with the user.

The server-side control unit 35 confirms whether there are matters to be confirmed with the user about an input image (S116). At this time, the server-side control unit 35 may judge whether there are matters to be confirmed based on whether image supplementary information meet predetermined conditions at the time when update of the image supplementary information at the step S114 has completed. For example, the server-side control unit 35 judges that there is a matter to be confirmed under a condition that the fields of a date and time of imaging, that is, the date and year and the event name, both indicate "*". Also, the server-side control unit 35 may judge that there is a matter to be confirmed under a condition that the fields of a site of imaging, that is, the latitude/longitude and the name of a site, both indicate "*".

When the result of judgment at the step S116 is Yes, the process proceeds to the step S118. At the step S118, the server-side control unit 35 inquires for lacking information among the image supplementary information. The server-side control unit 35 ends the inquiry at the time when the image supplementary information has met the conditions as a result of the inquiry.

For example, the server-side control unit 35 inquires for a site of imaging when the GPS module 24 is not provided to the communication device 2, and thus the site of imaging cannot be identified. Also, when an unregistered facial image is included, for example, in a plurality of images, the server-side control unit 35 inquires whether the facial image should be registered as a facial image of a user.

Also, when an event of an image cannot be identified, an inquiry is made about the event, or if the image is imaged in March, about whether the image should be identified as an image imaged at a graduation ceremony.

These inquiries to the user at the step S118 place a burden on the user. Accordingly, for example, if the user often posts messages on a blog or Twitter (registered trademark), the server-side control unit 35 acquires text data created by the user from the blog or Twitter (registered trademark), and analyzes the text data by using the text data analyzing unit 31*b*; thereby, the inquiries to the user can be omitted or the frequency of the inquiries can be reduced. Specifically, the user may be prompted to input accounts of the blog or Twitter (registered trademark) as the user supplementary information shown in FIG. 3. At this time, the analysis of an image by using the analyzing unit 31 and the extraction of additional information by using the information extracting unit 32 may be performed at timing that is different from the time of image input, and accordingly, the inquiries at the step S118 may be performed after the image input.

The server-side control unit 35 confirms with the user whether there are further image input (S120). Here, the server-side control unit 35 confirms whether the user wishes to input any image after changing the user ID to No. 123456-FRI-1, and if the user wishes to do so, the process returns to the step S112, and if not, the process proceeds to the step S122.

The server-side control unit 35 inquires the user whether to create a pair album (S122).

The album creation in this case includes two types. One is that proposed by the server 3. In one example, when it is judged that input images include pictures of a graduation ceremony of an elementary school of the user's child, the server-side control unit 35 proposes creation of a pair album by extracting pictures of family members with a theme of graduation ceremonies of elementary schools.

The other type of the album creation is creation of a pair album according to a request by the user. At this time, a theme may be input as text by the user by using the communication device 2, or alternatively the server 3 may present a list of themes to the communication device 2 to prompt the user to make a selection.

Figure 6:
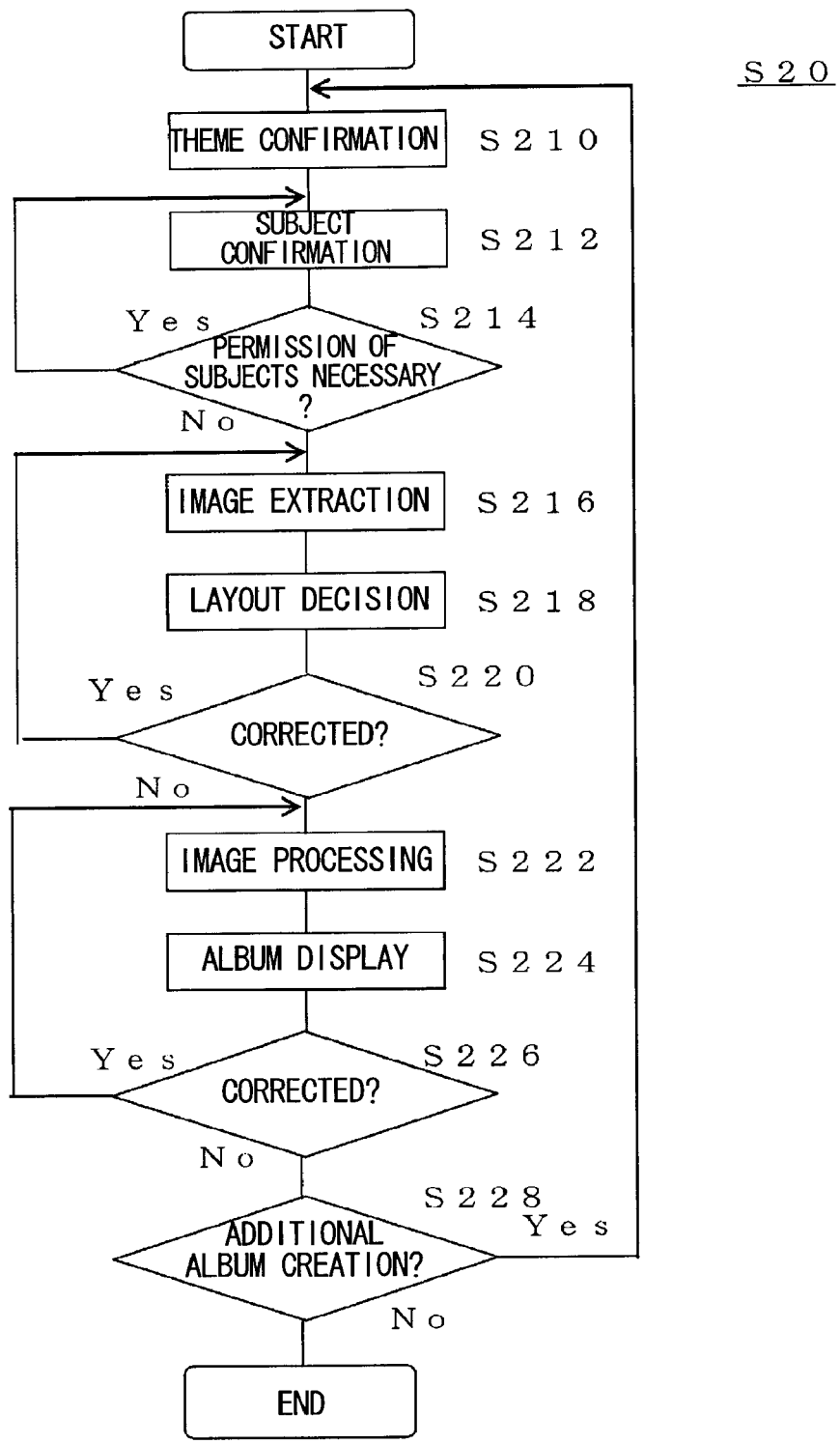
FIG. 6 is a flowchart about pair album creation (S20) performed by a server-side control unit 35.

In any case, the server-side control unit 35 proceeds to the flowchart S20 shown in FIG. 6 if the result of judgment by the user at the step S122 is Yes, and ends the process of the flowchart if the result of judgment by the user is No.

FIG. 5 shows an example of theme setting information. In the example shown in FIG. 5, the theme setting information includes keywords associated with a name of a theme, a template, a date and time of imaging, and a site of imaging. The date and time of imaging includes the number of years from a birth date, and timing when imaging is performed. Also, the site of imaging includes latitude/longitude, and a name of a site where the imaging is performed. Note that "*" in the example shown in FIG. 5 indicates that applicable information is not to be used for extraction of images. The theme setting information is input in advance and is stored in the server-side flash memory 33.

(Flowchart S20)

FIG. 6 is a flowchart about pair album creation (S20) performed by the server-side control unit 35, and hereinafter, operation of pair album creation is explained with reference to the flowchart.

The server-side control unit 35 confirms a theme of a pair album to be created (S210). At this time, for example, the server-side control unit 35 receives input of free format text from the communication device 2, calculates the degrees of coincidence between keywords included in the text, and keywords included in the theme setting information, and extracts a theme name with a high degree of coincidence. In place of receiving input of free format text, the server-side control unit 35 may display a list of theme names in the theme setting information, and receive a selection therefrom.

Here, pair album creation with a theme of an enrollment ceremony of a junior high school is explained.

The server-side control unit 35 confirms subjects for the album creation (S212). It is assumed here that all the four family members (father, mother, eldest son and eldest daughter) registered in the user supplementary information of the user are album-creation subjects. Note that this step S212 and the next step S214 may be omitted when subjects for the pair album creation are family members.

When creating a pair album, the server-side control unit 35 judges whether permission of album-creation subjects are necessary (S214). Here, because the family members are the album-creation subjects as described above, such judgment is not necessary. The judgment at the step S214 is necessary when the group information indicates friends, and use of all images is not approved. In this way, when permission of album-creation subjects are necessary for using images, the process returns to the step S212, and the permission is obtained from the album-creation subjects. Also, when the permission cannot be obtained from a certain album-creation subject, for example, within a preset length of time, the album-creation subject may be excluded from the group of album-creation subjects.

The server-side control unit 35, based on the them and in cooperation with the image extracting unit 36 of the album creating unit 34, extracts images stored in the server-side flash memory 33 (S216). At this time, the image extracting unit 36 compares information about the date and time of imaging and the site of imaging included in the theme setting information of the theme with information about a date and time of imaging and a site of imaging included in the image supplementary information of each image to extract images.

For example, when the theme is an enrollment ceremony of a junior high school, the image extracting unit 36 refers to the theme setting information shown in FIG. 5, and extracts images whose date and time of imaging shows that they were imaged in April and 12 years after the birth date, that is, images imaged in April when the subject is 12 years old. Also, the image extracting unit 36 refers to the name of a site of imaging in the theme setting information, and if a junior high school is included in the name of a site of imaging in the image supplementary information, that is, if the imaging-related information created by the meta information creating unit of the imaging unit 20 includes information about a junior high school or if the OCR unit identifies characters like "XX Junior High School, Enrollment Ceremony", extraction may be performed by giving weight to pictures with such information. Note that different countries adopt different schooling systems and different timing for enrollment and graduation. Accordingly, the server-side control unit 35 may extract images by correcting timing of enrollment based on information such as a site of imaging and latitude/longitude. For example, if the mother enrolled in a junior high school in September when she was 11 years old in a certain country, the server-side control unit 35 uses the image extracting unit 36 to extract, from the server-side flash memory 33, pictures of the mother imaged in September when she was 11 years old.

Note that, for example, if the theme is Hokkaido, the image extracting unit 36 extracts, from the server-side flash memory 33, images indicating the latitude/longitude of Hokkaido. That is, in theme setting information whose theme name is Hokkaido, the latitude/longitude of Hokkaido is set as the latitude/longitude of a site of imaging, and the image extracting unit 36 refers to the latitude/longitude, and compares the latitude/longitude with latitude/longitude of a site of imaging in the image attribute information of each image to extract images indicating the latitude/longitude of Hokkaido.

The server-side control unit 35, in cooperation with the image comparing unit 37 of the album creating unit 34, decides a layout of an album (S218). At this time, the image comparing unit 37 refers to a layout included in the theme setting information to decide a layout.

Figure 7:
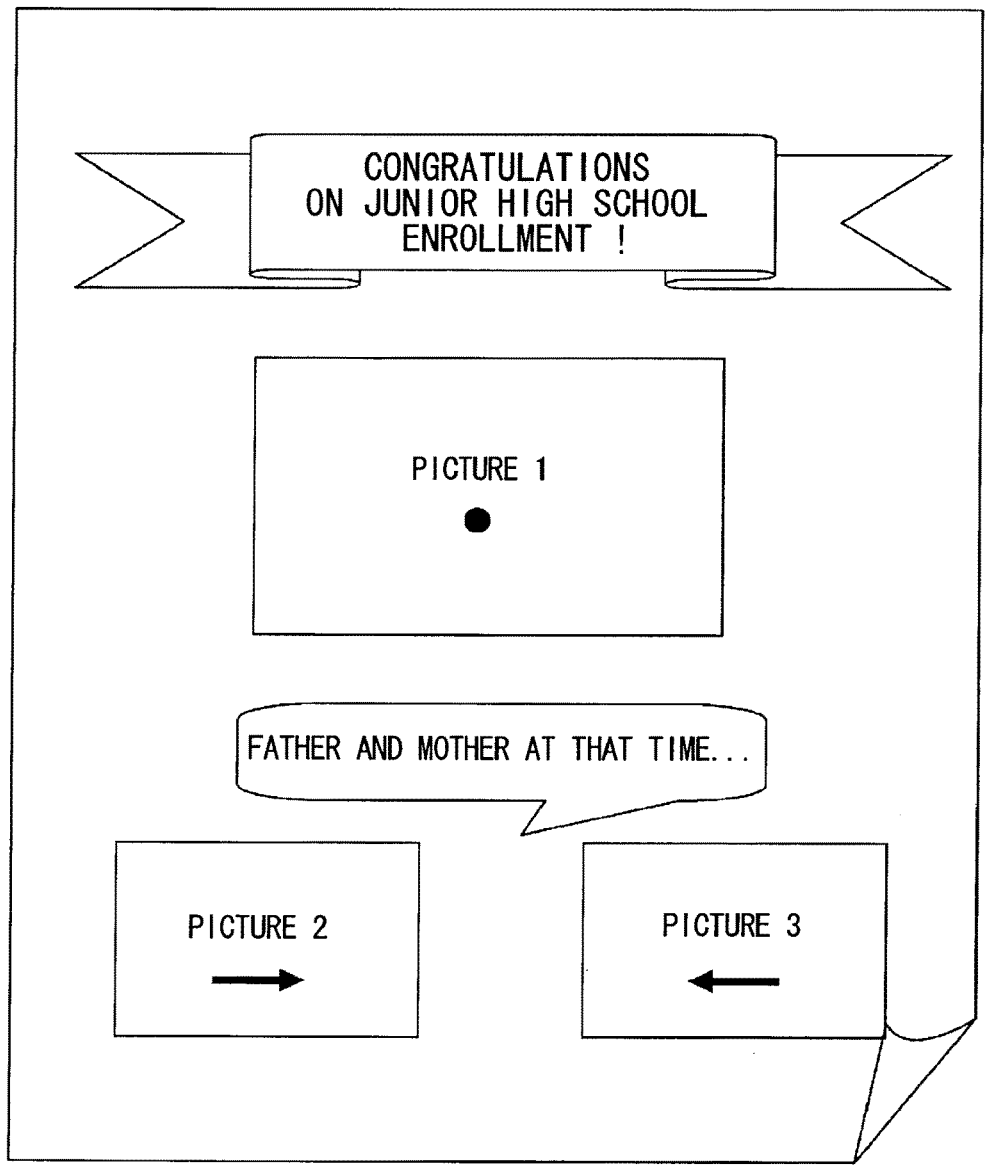
FIG. 7 shows an example of templates.

FIG. 7 shows an example of templates. Pictures 1 to 3 are to be arranged on the template shown in FIG. 7. Furthermore, preferred orientation of subjects is set in association with the position of each picture, and the orientation is indicated with arrows. Note that "-" about the orientation in FIG. 7 indicates that the orientation is toward the front side. At this time, the server-side control unit 35 may select a layout in which a picture of a child who has just enrolled in a junior high school is made larger than pictures of the other family members, or alternatively may select a layout in which pictures of all the family members are made almost equal in size.

When there is a plurality of pictures to be subjects at the step S218, the image comparing unit 37 may determine the order of images of each album-creation subject based on judgment about smiles, blurs and close eyes, sizes of images, and a result of the above described weighting. Furthermore, the image comparing unit 37 decides a layout such that, for example, older images are positioned on the left and newer images are positioned on the right. Also, when the template shown in FIG. 7 is used, the image comparing unit 37 extracts images such that, for example, the father and the mother face each other in images by using information about orientation of subjects included in the template. Also, parameters for deciding a layout may include whether subjects in an image are arranged horizontally or vertically.

After a layout is decided, the user is inquired of whether images to be used and the layout need to be corrected (S220). For example, the server-side control unit 35 may prompt the user to make a selection among about two combinations of layouts and images. Here, in the following explanation, it is assumed that no correction is necessary.

As described above, the server-side control unit 35, in cooperation with the image processing unit 38 of the album creating unit 34, performs process of resizing, trimming, and sizing of images, and process for displaying, together with the images, titles and subtitles (dates and times, and sites of imaging) (step S222).

Next, the server-side control unit 35 displays a created album on the display unit 23 of the communication device 2 that the user uses, via the server-side communication unit 30 (S224). Then, the server-side control unit 35 confirms with the user whether there is necessity for correction about the page number of the album, the order of images to be shown, and process that has been performed on the images (S226).

Note that when the user has selected an auto-creation mode, the step S220 and the step S226 may be omitted.

Figure 8:
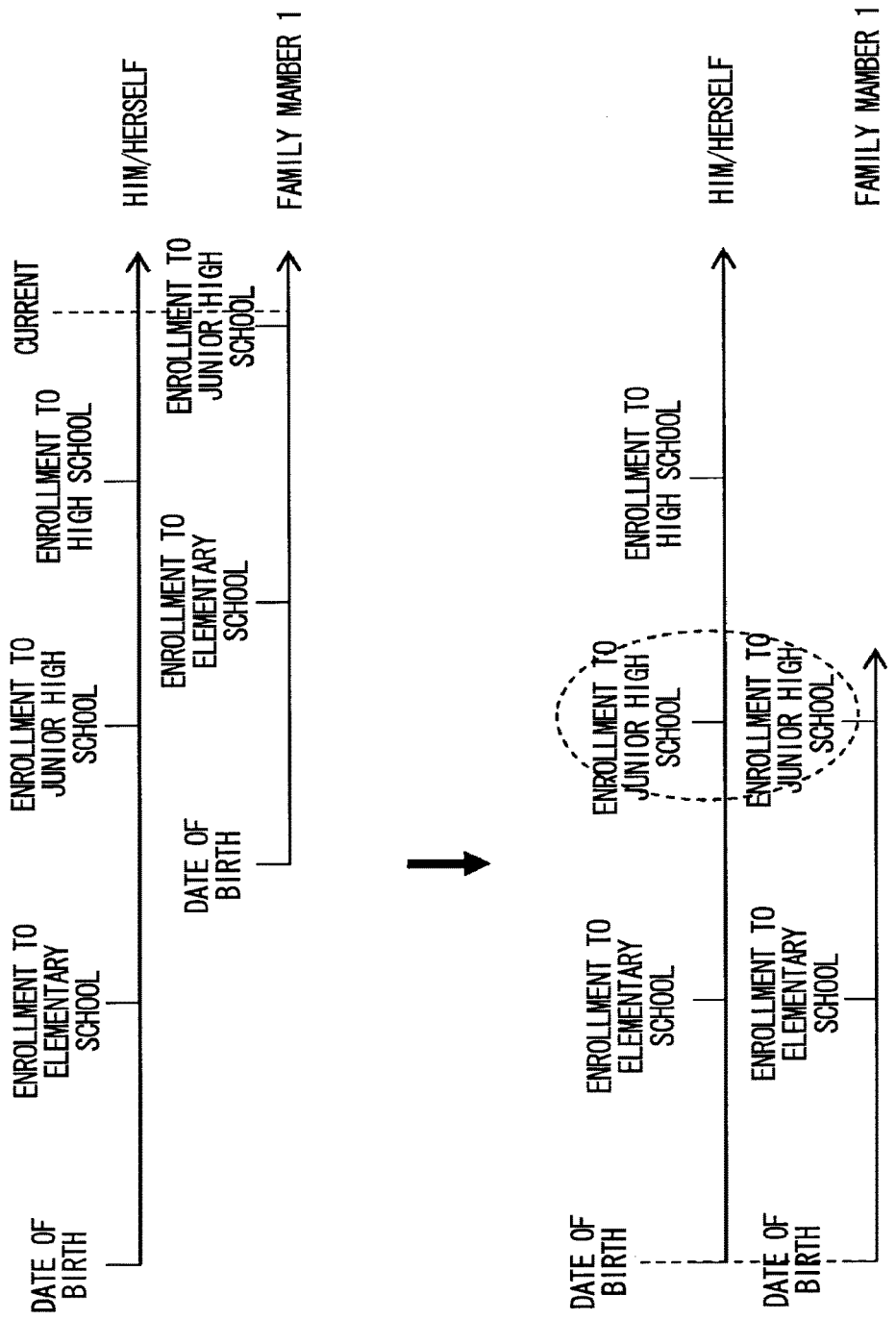
FIG. 8 is a conceptual diagram for explaining time axes of images extracted with the theme shown in FIG. 5.

FIG. 8 is a conceptual diagram for explaining time axes of images extracted with the theme shown in FIG. 5. In album creation by using the theme setting information shown in FIG. 5, images with a date and time of imaging, "birth year+12", are extracted by the image extracting unit 36. Here, although there is an age difference between the child who has just enrolled in a junior high school and a family member 1 such as his/her mother by the difference in their birth dates, the theme, an enrollment ceremony of a junior high school, is an event that is, commonly, held when they are 12 years old. Accordingly, the life time axes are relatively aligned with reference to the birth dates of both the child who has just enrolled in a junior high school and the family member 1, and images of corresponding events are extracted by the image extracting unit 36.

Although in the example explained above, a pair album is created mainly for family members, album creation is not limited thereto, alumni may be registered, and pair albums may be created with a theme of marriage or birth of children. At this time, timing of marriage and timing of children's birth differ person by person. In such cases, the server 3 may create albums with themes such as an album for a tenth wedding anniversary and an album for a one-year-old child by relatively aligning life time axes based on character recognition by the OCR unit of the image analyzing unit 31a, and sites of imaging detected by the GPS module 24 (sites of places of wedding and (maternity) hospitals). Also, the server 3 may relatively align life time axes based on first images related to a certain event as explained below with reference to FIG. 9.

Also, various types of SNS (social network service) have been proposed recently, and people can exchange information even with remote people. The present example can be applied to such circumstances, and for example, pair albums can be created in accordance with a theme of a group of people who share a hobby or a liking. At this time, if a user prefers not making his/her image or his/her family's image visible, the face portion may be masked, and the resolution of images may be made gradually higher as the number of times of pair album creation increases. Also, scenery, which is not related to facial images, may be selected as a theme.

FIG. 9 shows another example of theme setting information. The theme setting information shown in FIG. 9 includes, similar to FIG. 5, keywords associated with a name of a theme, a template, a date and time of imaging, and a site of imaging.

In FIG. 9, the theme is a premiere of piano concerts. Timing of premieres of piano concerts differs for each person, and judgment of the timing cannot be made based on birth dates. However, because the theme is a "premiere", if a plurality of images which were imaged at events of piano concerts and whose subjects are the same single person and dates and times of imaging are different are stored in the server-side flash memory 33, the one whose date of imaging is the earliest is reasonably estimated as the image of the "premiere". Accordingly, "first" is set in the field of a date and time of imaging of the theme setting information of FIG. 9.

Specifically, images may be extracted by making the OCR unit of the image analyzing unit 31a read out the characters "Concerts", in images, or by detecting sounds of piano by using the audio data analyzing unit. Alternatively, a template image of a piano may be stored in the server-side flash memory 33, and images of piano performance may be extracted by the server-side control unit 35 by performing pattern matching of images stored in the server-side flash memory 33 with the template image. In addition, the server-side control unit 35 may extract, from the above-described information on a blog or Twitter (registered trademark), information related to piano concerts. In this way, the image extracting unit 36 extracts an image whose date of imaging is the earliest among images which were imaged at events of piano concerts and whose subjects are the same single person and dates and times of imaging are different. Note that, detection of first events like the one described above can be applied to, other than piano performance, performance of other instruments, and participation in sports events.

Figure 10:
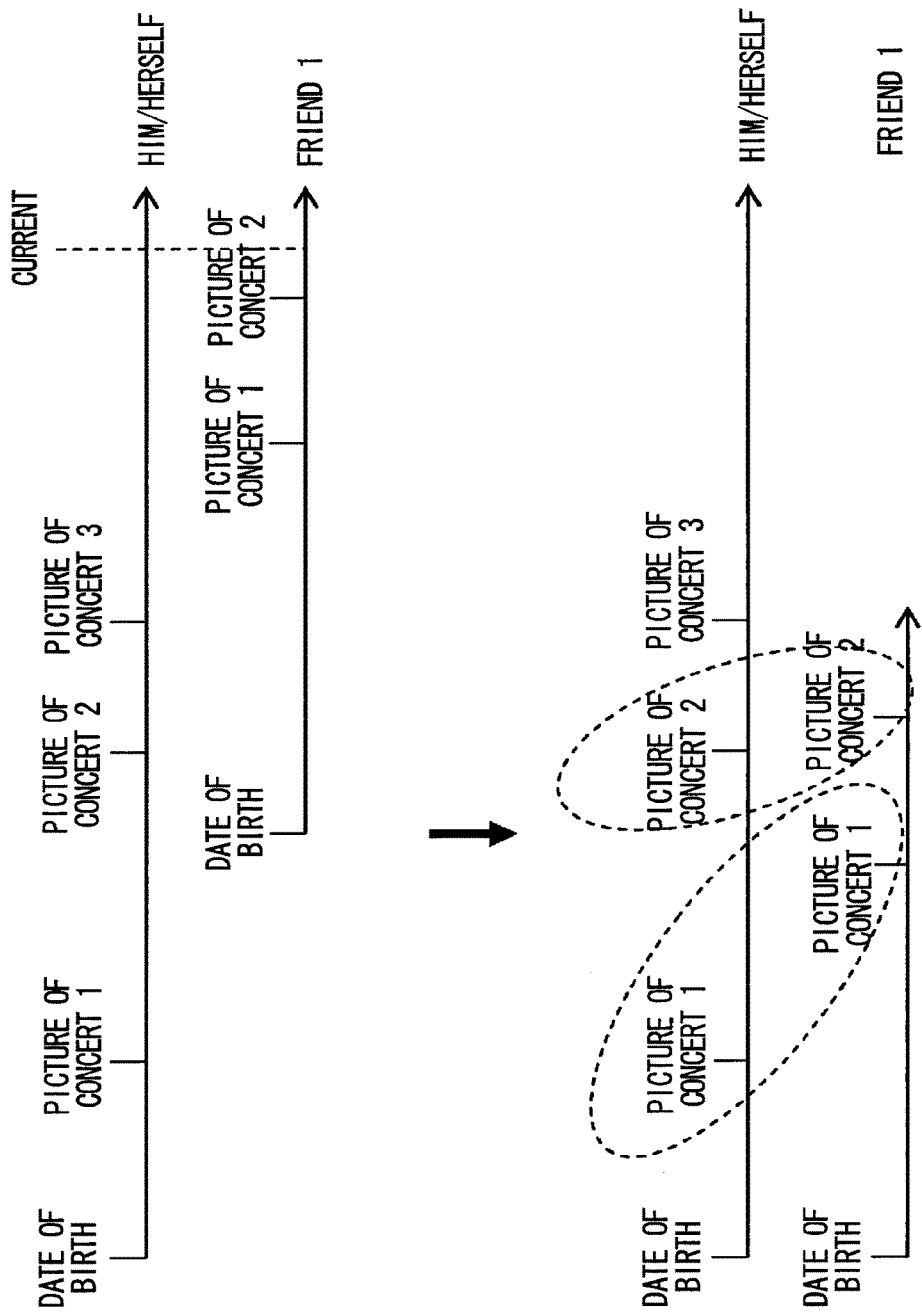
FIG. 10 is a conceptual diagram for explaining time axes of images extracted with the theme shown in FIG. 9.

FIG. 10 is a conceptual diagram for explaining time axes of images extracted with the theme shown in FIG. 9. In album creation by using the theme setting information shown in FIG. 9, performance images 1 whose dates and times of imaging are the earliest among images of the user and a friend 1, respectively, are extracted by the image extracting unit 36. Here, the length of a period from the birth date of the user to a date and time when the performance image 1 was imaged is different from the length of a period from the birth date of the friend 1 to a date and time when the performance image 1 was imaged, and the dates and times of the images are different from each other. However, with reference to the respective orders of the dates and times of imaging for the user and the friend 1, the life time axes are relatively aligned, and images of corresponding events are extracted.

Note that although in the embodiment, theme setting information is input in advance, theme setting information may be automatically generated by the server 3. At this time, when a new image is input, theme setting information may be generated by using, as a new theme name, an event name included in image supplementary information of the image.

As explained above, according to the present embodiment, image extraction can be performed by using supplementary information because when an image including an image of a first person and an image including an image of a second person are extracted, images with different dates and times of imaging are extracted based on the supplementary information.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An electronic device comprising:
an input unit configured to receive image data that is imaged by an external device having an imaging unit and to receive associated information regarding date and time of imaging and site of imaging;
a storage unit configured to store therein image data and the associated information regarding the date and time of imaging and the site of imaging inputted to the input unit;
an extracting unit in communication with the storage unit, the extracting unit being configured to extract a plurality of image data in which the date and time of imaging and the site of imaging are associated, from the image data stored in the storage unit;

a generating unit in communication with the extracting unit, the generating unit being configured to generate a first image data by processing the plurality of image data extracted by the extracting unit comprising sizing, resizing, trimming, or positioning or any combination thereof and arranging the plurality of processed image data linearly such that compositions and backgrounds of the plurality of image data fit; and an output unit in communication with the generating unit, the output unit being configured to output at least one of the first image data generated by the generating unit and the image data stored in the storage unit to the external device.

2. The electronic device according to claim 1, wherein the extracting unit is configured to extract a plurality of image data in which attributes of subjects or orientations of subjects are associated, from the image data stored in the storage unit.

3. The electronic device according to claim 2, wherein the extracting unit is configured to extract a plurality of image data in which faces, names, birth dates, addresses, families, family relationships, friends of persons included in images based on the image data stored in the storage unit are associated.

4. The electronic device according to claim 2, wherein the generating unit is configured to generate the first image data by processing the plurality of image data such that attributes of subjects or orientations of subjects of images based on the image data fit.

5. The electronic device according to claim 1, wherein the extracting unit is configured to extract a plurality of image data in which text data or meta data stored associated with the image data are associated, from the image data stored in the storage unit.

6. The electronic device according to claim 5, wherein the generating unit is configured to generate the first image data by processing the plurality of image data in which text data or meta data stored associated with the image data match.

7. The electronic device according to claim 1, further comprising:

an analyzing unit configured to analyze the image data stored in the storage unit, wherein the extracting unit is configured to extract a plurality of image data in which analyzing results by the analyzing unit are associated.

8. The electronic device according to claim 7, wherein the analyzing unit is configured to analyze faces, particular subjects, or characters included in the images based on the image data, and the extracting unit is configured to extract a plurality of image data in which faces, particular subjects, or characters included in the images based on the image data are associated.

9. The electronic device according to claim 7, wherein the analyzing unit is configured to analyze an event associated with the image data, and the extracting unit is configured to extract a plurality of images associated with the event.

10. The electronic device according to claim 1, wherein the extracting unit is configured to extract a plurality of image data in which at least capturing times are different.

11. The electronic device according to claim 1, further comprising:

a communication unit is configured to communicate with the external device, wherein the image data are inputted to the input unit from the external device through the communication unit, and the output unit is configured to output the first image data to the external device through the communication unit.

12. A non-transitory computer-readable recording medium having stored thereon a program that causes a computer to perform operations comprising:

inputting image data that is imaged by an external device having an imaging unit and associated information regarding date and time of imaging and site of imaging;

storing the inputted image data and the associated information regarding the date and time of imaging and the site of imaging;

extracting a plurality of image data in which the date and time of imaging and the site of imaging are associated, from the stored image data;

generating a first image data by processing the extracted plurality of image data comprising sizing, resizing, trimming, or positioning, or any combination thereof and arranging the plurality of processed image data linearly such that compositions and backgrounds of the plurality of image data fit; and outputting at least one of the generated first image data and the stored image data to the external device.

13. The electronic device according to claim 1, wherein the extracting unit is configured to extract a plurality of image data according to latitude and longitude of the site of imaging.

* * * * *